:::
United States Patent Office 3,528,807
Patented Sept. 15, 1970

---

3,528,807
COPPER BRAZING ALLOY
Frank M. Gault, 148 High Tor Drive,
Watchung, N.J. 07060
No Drawing. Filed Apr. 9, 1968, Ser. No. 719,998
Int. Cl. C22c 9/02, 9/08
U.S. Cl. 75—156                                    4 Claims

ABSTRACT OF THE DISCLOSURE

A copper brazing alloy consisting of 3 to 12% phosphorous, 0.05 to 36% lead, 0.05 to 15% tin, 0.05 to 15% antimony, and the balance copper.

---

This invention relates to alloys used to join metals by the brazing process (sometimes called high temperature soldering or hard soldering).

For many years, industry has used various alloys containing copper and phosphorus as brazing media to join other metals and alloys—principally pure copper and copper base alloys—for such applications as electrical bus bars, electrical motor parts, water piping, and tubing systems in air conditioning and refrigeration equipment. The basic alloys of this kind were disclosed in the Jones Pat. No. 1,651,709.

These alloys are valuable for brazing because phosphorus lowers the melting point of copper. A sufficient amount of phosphorus will produce a copper-phosphorus alloy with a melting temperature substantially below the melting points of pure copper and most other copper alloys. Furthermore, phosphorus is a deoxidizing agent, and often parts can be joined without the use of a flux.

The addition of phosphorus to copper, however, presents some problems. Very small additions of phosphorus do not seriously impair the mechanical properties of the resulting alloy, but phosphorus additions in the amounts needed to produce alloys with melting points low enough for brazing applications also harden and embrittle copper. In all probability, this is due to the formation of brittle compounds of copper and phosphorus. Thus, the more phosphorus that is added, the more brittle the resulting alloy becomes. The most common alloys in use by industry contain between 5% and 8% phosphorus. These alloys are brittle, and can be fabricated only in a limited manner by working when the metal is hot. They are too brittle to be cold worked to any appreciable extent.

These brittle characteristics cause problems in fabrication, and tend to be carried over to finished joints made with these alloys. When brazed parts are subjected to high stress or deformation or shock, there is a high probability the joints will fail or fracture. Reducing the phosphorus content will lessen these dangers, but only at the sacrifice of higher melting and flowing temperatures. Thus, an alloy that contains 5% phosphorus, while brittle, is more ductile than one containing 7% phosphorus, but melts and flows approximately 200° F. higher in temperature. Further reductions in phosphorus would produce results in like manner—greater ductility but higher and higher temperatures.

To help overcome these problems, silver is frequently added to copper-phosphorus alloys. Some of these compositions were disclosed in the Leach Pat. No. 1,829,903. Silver additions lower melting points, allowing alloys with somewhat lower phosphorus content within the same general temperature range. Silver also increases ductility thereby allowing greater ease in working and fabricating the metal, and resulting in stronger and more ductile brazed joints. Silver-copper-phosphorus alloys are often used in preference to straight copper-phosphorus alloys where parts are subjected to stress, vibration ar shock. Silver additions, however, add greatly to the cost of brazing alloys.

I have discovered that an addition of lead to the straight copper-phosphorus alloys has a beneficial effect upon its physical properties. My tests have shown that a small addition of lead increases the ability of this alloy—even though it has a high phosphorus content—to sustain cold work without cracking or failure. This improvement is exhibited in fabrication, and even more important, joints brazed with this alloy exhibit a marked improvement in ability to withstand stress, vibration and shock. Thus, the addition of lead preserves the low melting and flowing properties of the high phosphorus alloy and obtains the advantages of silver, without the high cost of silver.

I am not completely certain why lead improves copper-phosphorus alloy, but I believe the lead causes a dispersal of the most brittle copper-phosphorus compounds more evenly throughout the total metal structure. The total amount of these brittle compounds probably remains the same, but their arrangement is altered by the presence of lead. As the brazing alloy solidifies from the molten state, I believe the lead prevents a damaging segregation or concentration of brittle compounds. When cooled, the brittle compounds are dispersed more evenly, suspended in a more ductile matrix. The result is an alloy with improved properties.

Adding lead to copper alloys is not new. Lead is frequently added in small amounts to wrought copper alloys to improve machinability, and from small to large amounts of lead are often added to cast copper alloys to improve machinability and also to improve wearing properties for bearing applications.

The novelty of my invention is that lead is added to a high phosphorus content alloy for brazing. The phosphorus content of wrought copper alloys is very small—from zero to sub-fractions of one percent. The phosphorus content of cast copper alloys varies from zero to nominal amounts, but rarely exceeding one percent. It appears in cast alloys principally as a deoxidizer, to prevent absorption of gases during the casting of forms. As discussed before, large additions of phosphorus are necessary to produce an alloy suitable for brazing purposes—the extreme limits extending from 3% to 12% phosphorus, and the most preferable amounts lying between 4.5% and 8.5%. Thus an alloy of this composition—copper with high phosphorus content and lead—is unique.

The objective of my invention is to provide brazing alloy with low melting and flowing properties which are necessary to satisfy the prerequisites of soldering and brazing (an alloy that melts and flows at a temperature substantially below the melting points of the metals to be joined), to provide an alloy which can be fabricated into convenient forms for users' handling, and to provide an alloy which will produce brazed joints with characteristics suitable for a broad range of service conditions. I have discovered that lead addition to copper-phosphorus alloy will accomplish these objectives without increasing metal cost, and with a savings in preparation by virtue of easier fabrication.

I have also discovered that additions of tin and antimony are helpful in introducing lead into solution with the copper-phosphorus alloy. These metals help carry the lead into the melt. They also make contribution to the melting, flowing and properties of the resulting alloy.

As indicated by previous exposition, this alloy could contain from 3.0 to 12.0 percent of phosphorus, .05 to 36.0 percent lead, .05 to 15.0 percent tin, .05 to 15.0 percent antimony, and the balance copper. As example of composition which have been found specifically and particularly satisfactory for joining metals by the brazing process, and included within the general specification:

(1)

| | Percent |
|---|---|
| Copper | 88.75 |
| Phosphorus | 7.0 |
| Lead | 2.0 |
| Tin | 2.0 |
| Antimony | 0.25 |

(2)

| | |
|---|---|
| Copper | 85.25 |
| Phosphorus | 6.5 |
| Lead | 4.0 |
| Tin | 4.0 |
| Antimony | 0.25 |

(3)

| | |
|---|---|
| Copper | 85.25 |
| Phosphorus | 6.5 |
| Lead | 6.0 |
| Tin | 3.0 |
| Antimony | 0.25 |

(4)

| | |
|---|---|
| Copper | 87.0 |
| Phosphorus | 4.5 |
| Lead | 4.0 |
| Tin | 0.25 |
| Antimony | 4.25 |

While the primary purpose of this invention is to provide improved alloy for brazing—the joining of two or more pieces of metal together—it is also possible this alloy could be used by melting and flowing it over the surface of a single piece, or several pieces, of metal with the objective of altering the surface of the metal. Thus, a soft metal, such as copper, could be given a harder surface, or better wearing surface, by the application of this alloy. This application of a brazing alloy, while not common, does occur in industry. Preferred composition for these applications would include:

(1)

| | Percent |
|---|---|
| Copper | 87.0 |
| Phosphorus | 8.0 |
| Lead | 3.25 |
| Tin | 1.55 |
| Antimony | 0.20 |

(2)

| | |
|---|---|
| Copper | 80.25 |
| Phosphorus | 4.25 |
| Lead | 12.0 |
| Tin | 3.0 |
| Antimony | 0.50 |

As indicated by the previous discussion, this alloy, by virtue of its high phosphorus content, can frequently be applied without the use of a flux. This is principally true in the case of pure copper. When applied to other metals and alloys, such as brass and bronze, a small amount of flux may be necessary because these metals often contain zinc, manganese and other constituents which are not deoxidized by phosphorus. Any of the widely available floride-borate fluxes which are active in the 1100° F. to 1500° F. range will accomplished the desired results.

Also, it should be apparent that this alloy need not be confined to use on copper and copper alloys. It is possible that in some instances this alloy may find application on steels, nickels and other alloys, although this brazing alloy is not specifically engineered for them. Accordingly, the references of applications of this alloy with copper and copper alloys should be considered as illustrative and not as limiting the scope of the following claims.

I claim:

1. A brazing alloy composition consisting of 3.0 to 12.0 percent phosphorus, 0.05 to 36.0 percent lead, 0.05 to 15.0 percent tin, 0.05 to 15.0 percent antimony, and the balance copper.

2. A brazing alloy composition consisting of 4.5 to 8.0 percent phosphorus, 0.05 to 5.0 percent lead, 0.05 to 5.0 percent tin, 0.05 to 0.50 percent antimony, and the balance copper.

3. A brazing alloy composition consisting of 4.5 to 8.0 percent phosphorus, 0.05 to 5.0 percent lead, 0.05 to 0.5 percent tin, 0.05 to 5.0 percent antimony, and the balance copper.

4. A brazing alloy composition consisting of 3.0 to 8.0 percent phosphorus, 5.0 to 25.0 percent lead, 0.5 to 5.0 percent tin, 0.05 to 0.50 percent antimony and the balance copper.

References Cited

UNITED STATES PATENTS 2,079,481  5/1937  Bennett _____ 75—156 X
2,079,482  5/1937  Bennett _____ 75—156.5 X CHARLES N. LOVELL, Primary Examiner U.S. Cl. X.R.

75—153, 154